US011754202B2

(12) United States Patent
Guiraud (10) Patent No.: US 11,754,202 B2
(45) Date of Patent: Sep. 12, 2023

(54) CLAMPING COLLAR FOR KEEPING AT LEAST ONE NET WORK ELEMENT ON A POST, ASSOCIATED POSITIONING SYSTEM AND POSITIONING METHOD

(71) Applicant: Orange, Issy-les-Moulineaux (FR)

(72) Inventor: Eric Guiraud, Châtillon (FR)

( * ) Notice: Subject to any disclaimer, the term of this patent is extended or adjusted under 35 U.S.C. 154(b) by 0 days.

(21) Appl. No.: 17/637,779

(22) PCT Filed: Aug. 24, 2020

(86) PCT No.: PCT/FR2020/051495
§ 371 (c)(1),
(2) Date: Feb. 23, 2022

(87) PCT Pub. No.: WO2021/038166
PCT Pub. Date: Mar. 4, 2021

(65) Prior Publication Data
US 2022/0282802 A1    Sep. 8, 2022

(30) Foreign Application Priority Data

Aug. 27, 2019    (FR) ..................................... 1909425

(51) Int. Cl.
*F16L 3/10* (2006.01)
*F16B 2/12* (2006.01)

(52) U.S. Cl.
CPC ............... *F16L 3/1016* (2013.01); *F16B 2/12* (2013.01)

(58) Field of Classification Search
CPC ............ F16L 3/1016; F16B 2/12; F16B 2/065
See application file for complete search history.

(56) References Cited

U.S. PATENT DOCUMENTS

| 2,785,217 | A | * | 3/1957 | Harley | ...................... | H02G 1/04 |
| | | | | | | 174/40 CC |
| 3,173,674 | A | * | 3/1965 | Ringle | ...................... | F16B 2/12 |
| | | | | | | 269/97 |
| 3,596,898 | A | * | 8/1971 | Hilburn | .............. | B23K 37/0533 |
| | | | | | | D8/72 |
| 4,616,797 | A | * | 10/1986 | Cramer | ................ | F16M 13/022 |
| | | | | | | 24/514 |

(Continued)

FOREIGN PATENT DOCUMENTS

| DE | 19946222 C1 | * | 4/2001 | ................ | F16L 3/11 |
| GB | 2354036 A | * | 3/2001 | ............ | F16L 55/035 |

(Continued)

OTHER PUBLICATIONS

International Search Report and Written Opinion dated Nov. 27, 2020 for Application No. PCT/FR2020/051495.

*Primary Examiner* — Eret C McNicholas
(74) *Attorney, Agent, or Firm* — Knobbe, Martens, Olson & Bear, LLP (57) ABSTRACT

A clamping collar for keeping at least one network element on a post is described, the collar being intended to clasp the post. The collar comprises clamping means capable of tightening the collar and configured to be actuated by means of a clamping tool, holding means for holding the at least one network element on the post, and positioning means for positioning the collar, the positioning means being capable of connecting the collar to a positioning tool, so as to be able to position the collar by means of the positioning tool.

16 Claims, 10 Drawing Sheets

(56) References Cited

U.S. PATENT DOCUMENTS

| | | | | |
|---|---|---|---|---|
| 4,852,848 A * | 8/1989 | Kucera | F16F 7/104 | 188/380 |
| 5,601,274 A * | 2/1997 | Minor | F21V 21/116 | 362/431 |
| 6,407,713 B1 * | 6/2002 | Mallenius | F16M 11/2014 | 343/890 |
| 6,527,240 B1 * | 3/2003 | Huang | A47G 23/0225 | 248/231.41 |
| 6,575,652 B2 * | 6/2003 | Krauss | F16D 1/087 | 403/396 |
| 6,962,234 B1 * | 11/2005 | Reeves | E04G 21/3276 | 182/36 |
| 7,000,730 B1 * | 2/2006 | Ostrobrod | E04G 5/045 | 182/36 |
| 7,140,579 B2 * | 11/2006 | Kirschner | F16L 3/1016 | 248/74.1 |
| 7,159,859 B2 * | 1/2007 | Fuller | B25B 5/166 | 269/170 |
| 7,404,532 B1 * | 7/2008 | Baril | E06B 9/04 | 256/73 |
| 7,926,771 B2 * | 4/2011 | DeMartine | F16M 11/10 | 248/229.23 |
| 8,312,966 B1 * | 11/2012 | Guthrie | E04G 5/045 | 182/36 |
| 8,336,837 B2 * | 12/2012 | Gephart | F16B 2/12 | 248/229.12 |
| 9,216,307 B2 * | 12/2015 | Liu | E04G 21/32 | |
| 9,404,605 B2 * | 8/2016 | Booth | H02G 7/053 | |
| 9,518,684 B2 * | 12/2016 | Juzak | F16L 3/1083 | |
| 9,611,664 B2 * | 4/2017 | Tsaousis | E04G 5/045 | |
| 9,866,004 B2 * | 1/2018 | Vaccaro | G09F 15/0037 | |
| 10,316,511 B1 * | 6/2019 | Chapman | E04B 1/40 | |
| 10,982,440 B2 * | 4/2021 | Hirth | F16B 2/065 | |
| 10,995,882 B2 * | 5/2021 | Anderson | F16L 3/1091 | |
| 11,248,722 B2 * | 2/2022 | Vaccaro | F16B 2/12 | |
| 11,274,435 B2 * | 3/2022 | Chapman | E04B 1/5831 | |
| 11,286,968 B1 * | 3/2022 | Hung | F16B 45/002 | |
| 2003/0042375 A1 * | 3/2003 | Sperry | F21V 21/116 | 248/218.4 |
| 2004/0195479 A1 * | 10/2004 | Gulley | F16B 2/12 | 248/228.1 |
| 2007/0163834 A1 * | 7/2007 | Casebolt | A62B 1/04 | 182/3 |
| 2010/0032535 A1 * | 2/2010 | Elliott | F16M 13/00 | 248/229.22 |
| 2014/0021316 A1 * | 1/2014 | Adams | F16M 13/02 | 248/316.6 |
| 2015/0119199 A1 * | 4/2015 | Keller | A63B 9/00 | 29/525.08 |
| 2015/0129639 A1 * | 5/2015 | Miller | B23K 37/027 | 248/674 |
| 2016/0152172 A1 * | 6/2016 | Eboli | F16M 13/022 | 248/230.5 |
| 2020/0386348 A1 * | 12/2020 | Anderson | F16B 2/10 | |
| 2021/0075083 A1 * | 3/2021 | Udagave | H01Q 1/1207 | |
| 2022/0037758 A1 * | 2/2022 | Kim | F16M 11/08 | |
| 2022/0112910 A1 * | 4/2022 | Tsorng | F16B 2/065 | |
| 2022/0282802 A1 * | 9/2022 | Guiraud | F16B 2/065 | |

FOREIGN PATENT DOCUMENTS

| | | | |
|---|---|---|---|
| KR | 101056640 B1 | 8/2011 | |
| WO | WO-0039470 A1 * | 7/2000 | F16B 2/065 |
| WO | WO-2012075576 A1 * | 6/2012 | F16L 3/1016 |
| WO | WO 2018088792 A2 | 5/2018 | |
| WO | WO-2018194295 A1 * | 10/2018 | F16B 2/065 |
| WO | WO-2019120500 A1 * | 6/2019 | F16L 3/11 |

* cited by examiner

CLAMPING COLLAR FOR KEEPING AT LEAST ONE NET WORK ELEMENT ON A POST, ASSOCIATED POSITIONING SYSTEM AND POSITIONING METHOD

RELATED APPLICATIONS

This application is the U.S. National Phase of Application No. PCT/FR2020/051495 entitled "CLAMPING COLLAR FOR KEEPING AT LEAST ONE NETWORK ELEMENT ON A POST, ASSOCIATED POSITIONING SYSTEM AND POSITIONING METHOD" and filed Aug. 24, 2020, which claims the benefit of French Patent Application No. 1909425, filed Aug. 27, 2019, each of which is incorporated by reference in its entirety.

TECHNICAL FIELD

This invention relates to the general field of the management of equipment of a network, and in particular relates to a clamping collar for retaining a network element on a post.

The invention more particularly applies to a network comprising overhead telecommunications lines, or of another kind. This can for example be a telephone network, fixed such as the PSTN (Public Switched Telephone Network) or a fiber optic network.

PRIOR ART

The overhead lines of such a network are formed by a plurality of posts carrying cables, the cables can in particular be retained on the posts by means of clamping collars attached to the upper part of the post, typically when the posts are made of wood, these clamping collars supporting a crossbar for receiving the cable. Overhead lines can be damaged over time, for example following adverse weather conditions, such as a storm.

A clamping collar clamping a post or at least a part of the collar, for example the crossbar, can for example be torn off and must thus be replaced by a network equipment maintenance team. It can also be necessary to install a new crossbar to receive new cables.

Figure 1:
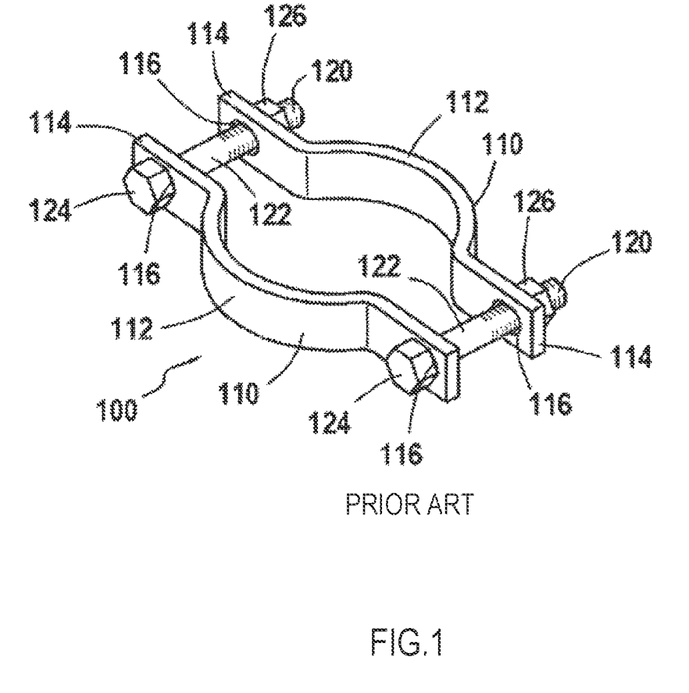
FIG. 1, already described, schematically represents a known clamping collar.

An example of a clamping collar 100 is shown in FIG. 1. As shown in this FIG. 1, the collar 100 comprises two collar parts 110 and two bolts 120.

Each collar part 110 comprises a semicircular section 112 and two lugs 114, each lug 114 being positioned at one end of the semicircular section 112 and comprising an orifice 116. In addition, each bolt 120 comprises a screw 122 comprising a head 124 and a nut 126.

In order to attach the collar 100 at the level of the upper part of a post, an operator must be raised to the level of the upper part of the post. The operator then positions both collar parts 110 around the post and inserts the screw 122 of one of the bolts into one of the orifices 116 of each collar part 110 before screwing the nut 126, such that the two collar parts 110 are retained between the head 124 of the screw 122 and the nut 126.

The operator then tightens the bolt 120 such as to bring the two collar parts 110 closer together and thus attach the collar 100 to the post.

The operator then repeats these operations on the other side, by inserting the screw 122 of the other bolt 120 into the other orifices 116.

Since the clamping collar must be positioned at height, a ladder being conventionally used in order to raise the operator, the top of the ladder being positioned against the wooden post. This practice is no longer recommended, however, and even sometimes prohibited for safety reasons.

Several solutions exist in order to replace maintenance operations using a ladder. The first solution is to replace the wooden post with a bearing, for example made of metal, of mechanical resistance compatible with the use of a ladder. However, this replacement, which involves conveying the bearing over terrain that is sometimes difficult to access, disassembling the post, assembling the bearing and managing the end-of-life of the post, is consequently a heavy operation, burdensome and hazardous, which requires a significant amount of equipment. This solution is thus not often used due to the numerous operational difficulties.

A second solution is to use a manlift, for example a rough-terrain manlift, a boom lift, or else a caterpillar track lift, in order to access the upper part of the post. However, the installation of such a manlift requires the presence of a clear area around the post, which makes the use of the manlift impossible for many posts. Furthermore, such an operation may take time, requires fairly significant logistics and the cost of such an operation is consequently quite high.

A third solution provided is the use of a freestanding ladder to access the upper part of the post. However, such a ladder is not easy to use and its use may not be permitted by the safety policy of a company.

There is therefore a need for a solution making it possible to install and attach a clamping collar to an upper part of a post in a simple, safe and inexpensive way, even in a hard-to-access area.

SUMMARY OF THE INVENTION

This invention relates to a clamping collar for retaining at least one network element on a post, said collar being intended to fit around said post, said collar comprising:
  clamping means able to tighten the collar,
  means for retaining said at least one network element on the post, characterized in that:
  the collar further comprises means for positioning the collar, being suitable for connecting the collar to a positioning tool, so as to be able to position the collar by means of the positioning tool,
  the clamping means are configured to be actuated by means of a clamping tool.

The positioning and clamping means allowing remote handling of the collar, by means of positioning and clamping tools which typically take the form of first and second poles, the collar can be attached to the post from the ground, more precisely to an upper part of the post. It is thus no longer necessary to rely on a means allowing an operator to be raised to the level of the upper part of the post, such as a ladder, a scaffold or a manlift.

The cost of positioning the network element on the post is thus greatly reduced. In addition, the collar and rods being relatively light and non-bulky equipment items, it is possible to access, for example on foot, a post located in an area that is hard to access.

Furthermore, the configuration of the clamping collar makes it possible to improve the safety of the operators, by reducing their physical effort and removing the need for them to work at height.

Moreover, when the clamping collar is positioned at the level of a lower part of the post then slides along the post, an accidental fall of the clamping collar occurs by it sliding along the post in the reverse direction, thus limiting the risks for operators who are standing around the post.

In a particular embodiment, the positioning means comprise picking-up means able to be connected to additional picking-up means of the positioning tool positioned at one end of the positioning tool, to allow the elevating of the collar and/or the retaining of the collar at height by means of the positioning tool.

This makes it possible to secure the elevating of the clamping collar by avoiding it falling back down when it is elevated.

In a particular embodiment, the clamping collar further comprises a first collar part and a second collar part, the clamping means being able to bring the first collar part and the second collar part closer together.

The clamping collar can thus be positioned by the operator on the lower part of the post by loosely clamping the clamping means, such that the collar can slide along the post, then once positioned at the desired height be clamped securely, such as to attach the collar. In addition, the structure of the collar in two collar parts allows its installation by the operator on the lower part of the post.

In a particular embodiment, the clamping means comprise:
  means for coupling the two collar parts,
  gripping means able to be gripped by means of said clamping tool,
  angular transmission means forming a cardan joint between the gripping means and the coupling means,
  such that the rotation of the gripping means by means of the clamping tool allows the rotation of the coupling means, the rotation of the coupling means bringing the first collar part and the second collar part closer together.

This makes it possible to attach the clamping collar to the upper part of the post simply and safely, without requiring any significant physical effort for the operator.

In a particular embodiment, the angle of the cardan joint between the gripping means and the coupling means is able to be adjusted by means of the clamping tool, such as to adapt the positioning of the gripping means to the position of the clamping tool.

This makes it possible to adapt the clamping collar as a function of the environments in which the operators are required to operate. The position of the operator with respect to the post can thus be taken into account owing to the angle of the cardan joint.

In a particular embodiment:
  the coupling means comprise at least one threaded rod,
  the gripping means comprise at least one ring-shaped handle, able to be gripped by a hook positioned at the end of the clamping tool.

In a particular embodiment:
  at least one collar part comprises a central section and at least one nut,
  said at least one nut extending around said at least one threaded rod,
  the central section being linked to said at least one nut by means of a pivot coupling, the pivot coupling making it possible to adjust said at least one collar part around the post.

In a particular embodiment, the central section comprises a semicircular part comprising at least one retaining groove.

The retaining groove makes it possible to retain the collar against the post after the clamping of the collar.

In a particular embodiment:
  the cardan joint is positioned at a first end of said at least one threaded rod,
  a removable stop is attached to a second end of said at least one threaded rod,
  such that the nut is retained on said at least one threaded rod, between the cardan joint and the removable stop.

The stop makes it possible to avoid the collar opening if the clamping means are actuated in the wrong direction, and moreover makes it possible to open the collar to position it around the post.

In a particular embodiment, the clamping means comprise:
  a ratchet wheel comprising a toothed wheel attached to a first end of the collar and at least one pawl attached to a second end of the collar,
  gripping means able to be gripped by means of the clamping tool,
  angular transmission means forming a cardan joint between the gripping means and the toothed wheel,
  such that the rotation of the gripping means by means of the clamping tool allows the rotation of the toothed wheel, the rotation of the toothed wheel tightening the collar by hooking said at least one pawl.

In a particular embodiment, the retaining means comprise a crossbar, a hooking plate, and/or a ring.

The invention also relates to a system for positioning at least one network element on a post, comprising:
  a clamping collar as described above,
  the positioning tool able to position the collar, and
  the clamping tool able to actuate the clamping means of the collar.

The system used to position the network element on the post is thus ergonomic.

The advantages presented for the clamping collar as previously described are directly transposable to the positioning system.

In a particular embodiment, the clamping means is a pole, the so-called second pole, a first end of the second pole comprising a hook and a second end of the second pole comprising a crank.

The invention further relates to a method for positioning at least one network element on a post, implemented by means of the positioning system as described above, said method comprising the following steps:
  connecting the positioning means of the collar to the positioning tool, such as to position the collar,
  while retaining the position of the collar by means of the positioning tool, actuating clamping means of the collar by means of the clamping tool, such as to tighten the collar and thus attach the collar to the post.

The advantages set out for the clamping collar as previously described are directly transposable to the positioning method.

In a particular embodiment, the method further comprises the following step:
  hooking, by means of the positioning tool or a hooking tool, said at least one network element to the retaining means of the collar, in order to retain said at least one network element on the post.

BRIEF DESCRIPTION OF THE DRAWINGS

Other features and advantages of this invention will become apparent from the description given below, with reference to the appended drawings which illustrate an exemplary embodiment thereof without any limitation. On the figures.

DESCRIPTION OF THE EMBODIMENTS

The invention relates to a clamping collar making it possible to retain at least one network element, such as a cable, a cable support and/or an anchoring clamp for a cable, on a post. The term "post" should be understood to mean a post, or several posts connected together, for example two tied posts. The clamping collar is intended to fit around the post, i.e. to surround the post while clamping it, such as to be securely attached to the post. The collar can moreover be attached at height, on an upper part of the post. The upper part of the post is typically a part of the post which is not at man height, i.e. a part of the post that a man on the ground cannot reach without any appropriate tool, such as a pole.

The post is for example a wooden post, and the cross-section of the post is typically rounded. The post can be of slightly conical shape, the diameter of the post at the level of the ground being greater than the diameter of the post at the level of the upper end of the post. The diameter of the post is for example between 76 millimeters and 220 millimeters for posts of telecommunications type. No restriction is attached to this diameter. The clamping collar proposed can be adapted to different post diameters. In addition, no restriction is attached to the geometrical shape of the cross-section of the post. The clamping collar can easily be adapted to other shapes, such as square, rectangular, triangular etc. The clamping collar can also be adapted to the shape of the cross-section of a set of posts connected together.

Figure 2A:
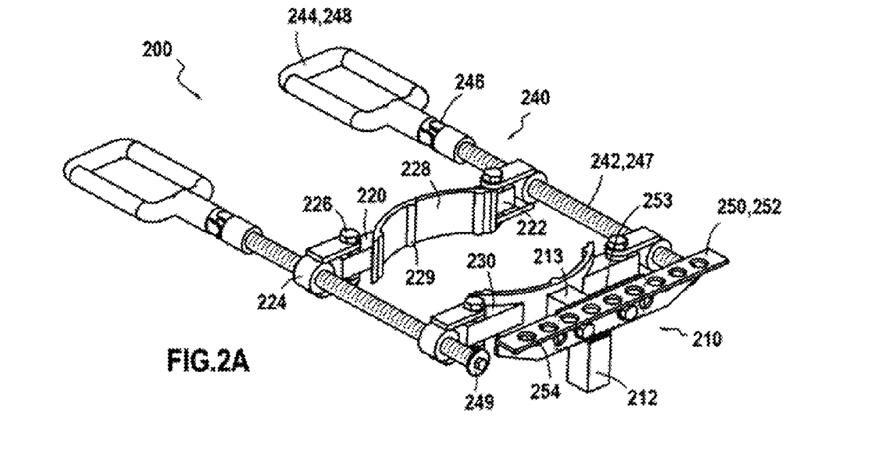
FIGS. 2A and 2B schematically represent a clamping collar according to an exemplary embodiment of the invention.
Figure 2B:
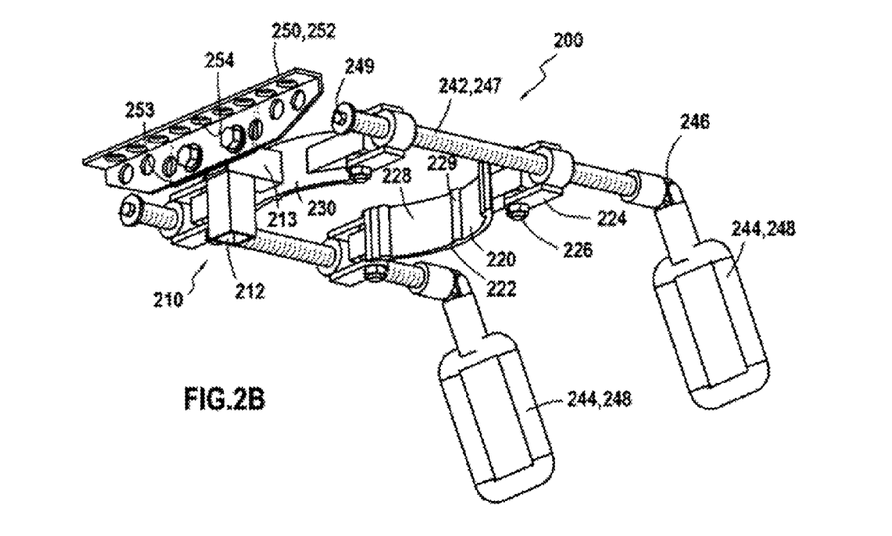
Figure 3:
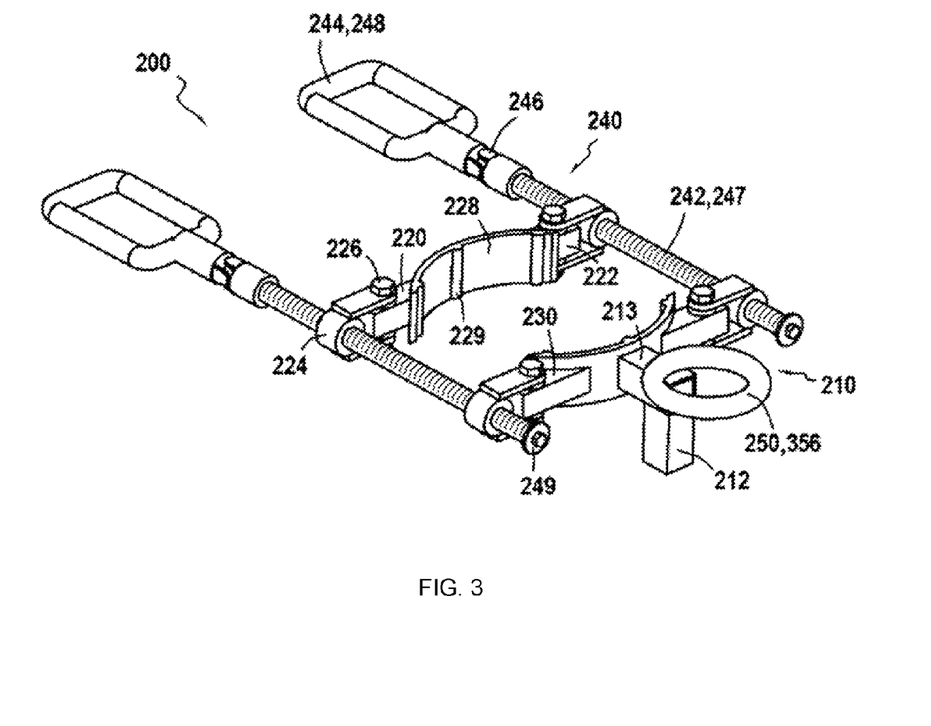
FIG. 3 schematically represents a clamping collar according to another exemplary embodiment of the invention.

FIGS. 2A, 2B and 3 schematically represent exemplary embodiments of a clamping collar 200 according to the invention.

As can be seen in these FIGS. 2A, 2B and 3, the clamping collar 200 comprises means 210 for positioning the collar able to position the collar 200 at the desired height on the post, clamping means 240 able to tighten the collar 200 around the is post, and means 250 for retaining the network element.

The means 210 for positioning the collar are more specifically able to connect the collar 200 to a positioning tool, such as to be able to position the collar 200 at the desired height on the post by means of the positioning tool.

Furthermore, the clamping means 240 are configured to be able to be actuated by means of a clamping tool, typically when the collar 200 is retained at the desired height around the post by means of the positioning tool. The positioning and clamping of the collar 200 are thus possible remotely.

More precisely, the positioning means 210 of the collar 200 comprise picking-up means 212 which can be connected to additional picking-up means of the positioning tool, such as to allow the elevating of the collar 200 and a retaining of the collar 200 at height by means of the positioning tool.

The positioning means 210 are typically securely attached to a second collar part 230, described in more details below, for example by means of a support 213.

In the rest of the description, it is considered that the positioning tool is a first pole and the clamping tool is a second pole. However, another positioning tool, typically comprising additional picking-up means, and/or another clamping tool, able to grip and/or turn the gripping means 244 of the collar 200 described hereinafter, could be used.

Figure 4:
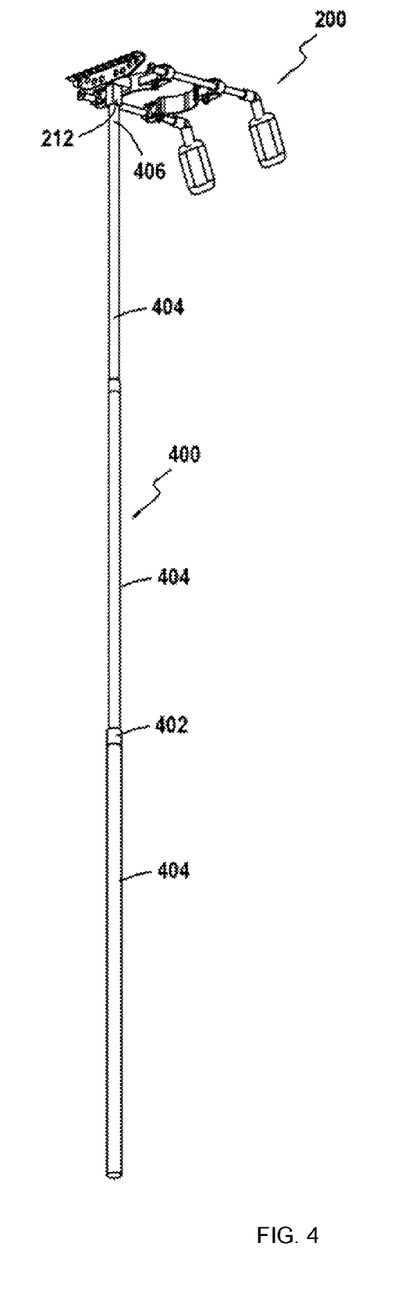
FIG. 4 schematically represents a first pole of a positioning system according to an exemplary embodiment of the invention.

FIG. 4 shows an example of a first pole 400, able to position the collar 200 and to be handled by an operator. As can be seen in this FIG. 4, the first pole 400 is typically a telescopic pole, the body 402 of the first pole 400 comprising several sections 404 interlocking and sliding into one another. The sections 404 of the body 402 of the first pole 400 can thus be extended during the positioning of the collar 200 and folded after the use of the first pole 400.

The picking-up means 212 typically take the form of a cavity 212, typically securely linked to a support 213, securely linked to a second collar part 230 described in more detail hereinafter. The cavity 212 can for example take the form of a hollow tube, typically of parallelepipedal shape.

The cavity 212 is configured to house the end 406 of the first pole 400. The additional picking-up means of the first pole 400 then comprise a protrusion having a suitable shape for being inserted into the cavity, this shape being typically parallelepipedal. The outer edges of the protrusion of the first pole 400 can then bear on the bottom and/or the inner edge of the cavity of the picking-up means 212 of the collar 200.

In a variant, the picking-up means 212 comprise a protrusion, the additional picking-up means of the first pole 400, positioned at one end 406 of the first pole 400 being then able to comprise a cavity able to receive the protrusion, the bottom and/or the inner bottom of the cavity which can then bear on the outer edges of the protrusion in order to allow the elevating of the collar 200 and/or its retaining at height around the post.

The additional picking-up means of the first pole 400 can form a first removable endpiece able to be positioned at the end 406 of the first pole 400. The first removable end thus has a shape suitable for being connected to the picking-up means 212 of the collar 200, and can thus comprise the protrusion or the cavity of the first pole 400.

A second removable end can be positioned at the end 406 of the first pole 400 in place of the first removable endpiece, the second removable endpiece comprising hooking means which can typically take the form of a hook making it possible to hook and unhook a network element to and from the retaining means 250 of the collar 200, the hook being for example S-shaped.

Locking means (not shown) can thus be used in order to unlock the connection between the first removable endpiece and/or the second removable endpiece and the body 402 of the first pole 400.

The body of the first pole 400 is typically made of fiber glass, thus ensuring high electrical insulation.

In a variant, when the additional picking-up means of the first pole 400 are securely attached to the body 402 of the first pole 400, a hooking tool such as a third pole may comprise the hooking means at one of its ends.

In a variant, the additional picking-up means of the first pole 400 and the hooking means take the form of one and the same hook, typically S-shaped.

The collar 200 may comprise a first collar part 220 and a second collar part 230, the clamping means 240 of the collar 220 being thus able to bring the first collar part 220 and the second collar part 230 closer together to fit around the post.

At least one collar part 220, 230 may comprise a central section 222 and at least one nut 224, the central section 222 being linked to the nut 224 by means of a pivot coupling 226, the pivot coupling making it possible to adjust the collar part 220, 230 around the post during the clamping of the collar 200.

More precisely, the axis of rotation is typically parallel to the axis of the post when the collar 200 fits around the post. As shown in FIGS. 2A, 2B and 3, the pivot coupling comprises at least one lug (typically two lugs), each lug comprising an orifice, an orifice fashioned in one end of the central section, and a rod extending through the orifice of each lug and the orifice of the central section 222. Furthermore, as shown in FIGS. 2A, 2B and 3, each collar part 220, 230 typically comprises a central section 222 and two nuts 224, each end of the central section 222 being connected to a different nut 224 by means of a pivot coupling 226. The pivot coupling 226 makes it possible to adjust the collar part 220, 230 around the post, during the clamping of the collar 200. Each central section 222 can also comprise a semicircular part 228, this part 228 being thus suitable for surrounding a post of rounded cross-section. In a particular embodiment, the part 228 typically comprises at least one retaining groove 229, for example a plurality of retaining grooves 229, each retaining groove 229 being intended to come into contact with the post during the clamping of the collar 200 and retain the collar against the post after the clamping of the collar 200.

The clamping means 240 may comprise coupling means 242 of the two collar parts 220 and 230, gripping means 244 able to be gripped by means of the second pole, and angular transmission means 246 forming a cardan joint between the gripping means 244 and the coupling means 242.

A rotation of the gripping means 244 by means of the second pole thus allows the rotation of the coupling means 242, the rotation of the coupling means 242 being transmitted to the coupling means 242 by the cardan joint 246 such as to bring the first collar part 220 and the second collar part 230 closer together.

As can be seen in FIG. 2B, the angle of the cardan joint 246 between the gripping means 244 and the coupling means 242 is typically adjustable, for example by means of the second pole, such as to adapt the position of the gripping means 244 to the position of the second pole.

The coupling means 242 typically comprise at least one threaded rod 247 around which said at least one nut 224 can extend, and the gripping means 244 may comprise at least one ring-shaped handle 248, able to be gripped by a hook positioned at the end of the second pole.

The ring of the handle 248 is an enclosed shape which can be circular, rectangular (see FIGS. 2A, 2B and 3), or triangular.

In addition, the cardan joint 246 is typically positioned at a first end of said at least one threaded rod 247, and a removable stop 249 can be attached, removably, to a second end of said at least one threaded rod 247, such that the nut 224 is retained on the threaded rod 247, between the cardan joint 246 and the removable stop 249.

The stop makes it possible to avoid the collar 200 from opening if the clamping means 240 are actuated in the wrong direction, and moreover makes it possible to open the collar 200 in order to position it around the post, particularly at the level of a lower part of the post. The term "lower part of the post" is understood to mean a part of the post located at man height.

As shown in FIGS. 2A, 2B and 3, the coupling means 244 thus typically comprise a first and a second threaded rod 247, the first collar part 220 comprises a first nut 224 and a second nut 224, and the second collar part 230 comprises a third nut 224 and a fourth nut 224.

The first nut 224 of the first collar part 220 extends around the first threaded rod while the second nut 224 of the first collar part 220 extends around the second threaded rod. Similarly, the third nut 224 of the second collar part 230 extends around the first threaded rod while the fourth nut 224 of the second collar part 230 extends around the second threaded rod. Thus, each threaded rod 247 links a nut 224 of the first collar part 220 to a nut 224 of the second collar part 230. More precisely, the first threaded rod links the first nut 224 to the third nut 224, and the second threaded rod links the second nut 224 to the fourth nut 224.

It will thus be understood that in this embodiment, two nuts 224 are positioned on each of the threaded rods. For each of the threaded rods, one of the nuts 224 comprises a screw pitch in a standard direction of tightening and the other nut 224 meanwhile comprises a screw pitch in the reverse direction to this standard direction. In a particular embodiment, the two nuts 224 of the first collar part 220 are in reverse pitch increments.

The length of the two threaded rods 247 is for example identical, and is defined as a function of the diameter of the post around which the collar can be attached.

Furthermore, the gripping means 244 comprise two handles 248, each handle 248 being connected to a threaded rod by a different cardan joint 246.

The nuts 224 extending around one and the same threaded rod 247 are thus typically retained on the threaded rod 247 between the associated cardan joint 246 and the associated removable stop 249.

In a variant, instead of the coupling means 244, the clamping means 240 comprise a ratchet wheel (not shown) comprising a toothed wheel attached to a first end of the collar and at least one pawl securely attached to a second end of the collar.

The angular transmission means then form a cardan joint between the gripping means and the toothed wheel, such that the rotation of the gripping means by means of the second pole allows the rotation of the toothed wheel, the rotation of the toothed wheel tightening around the collar 200 by hooking said at least one pawl.

Figure 5:
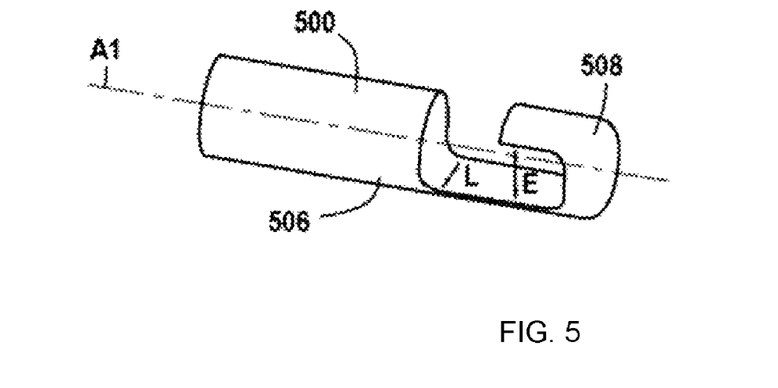
FIG. 5 schematically represents one end of a second pole of a positioning system according to an exemplary embodiment of the invention.

FIG. 5 shows an example of one end of a second pole 500, able to actuate the clamping means 240 of the collar 200 and able to be handled by an operator. The second pole 500 may comprise at its end 506 gripping means such as a hook 508.

As shown in FIG. 5, the hook 508 is typically formed by a notch, for example "L"-shaped, at the level of the end 506 of the second pole 500.

The dimensions of the hook 508 are defined such as to allow the hook 508 to grip each handle 248 and to turn it without difficulty. The width L of the hook 508 is for example equal to the diameter of the body of the second pole 500, and the thickness E of the hook 508 is for example equal to the thickness of the ring of each handle 248, to which a clearance is added.

The second pole 500 may comprise rotating means allowing the rotation of the gripping means of the second pole 500 around the axis A1 defined by the body of the second pole 500, such as a crank.

The second pole 500 may comprise a plurality of sections, typically fixed with respect to one another, in order to have better stiffness to provide the necessary tightening torque. Each section is for example 1.5 meters long. A so-called upper section, positioned at the end of the second pole, then comprises the gripping means, while a so-called lower section, able to be handled by the operator, may comprise the rotating means and/or a raised washer making it easier for the pole to hold together.

In a variant, the second pole 500 can be telescopic, its length being thus able to be adjusted to the desired height.

The body of the second pole 500 is typically made of aluminum and comprises plastic joints to allow electrical insulation.

As shown in FIGS. 2A and 2B, the retaining means 250 of the collar 200 may comprise a hooking plate 253 on which a crossbar 252 can be attached, typically securely. In a variant, the retaining means 250 of the collar 200 may comprise only the crossbar 252.

The crossbar 252 typically comprises one or more orifices 254. In a variant, as shown in FIG. 3, the retaining means 250 may comprise a ring 356.

The retaining means 250 are typically securely attached to the second collar part 230, for example by means of the support 213 thus linking the second collar part 230 to the positioning means 210.

Figure 6:
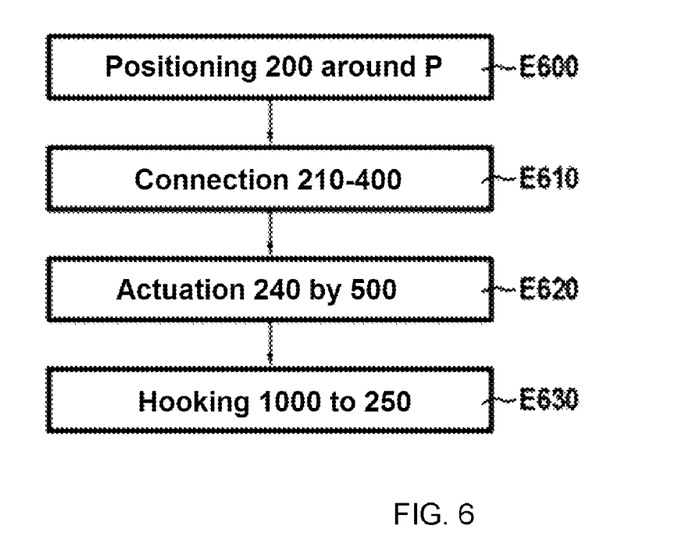
FIG. 6 represents, in the form of a flow chart, the main steps of a method for positioning at least one network element on a post, according to an exemplary embodiment of the invention.

FIG. 6 represents a method for positioning at least one network element on a post, in accordance with an exemplary embodiment of the invention. This method is implemented by a positioning system in accordance with an exemplary embodiment of the invention.

The positioning system comprises a clamping collar in accordance with an exemplary embodiment of the invention, such as the collar 200 of FIGS. 2A and 2B or the collar 200 of FIG. 3. The positioning system further comprises a positioning tool able to position the collar, such as a first pole, for example the first pole 400 of FIG. 4, and a clamping tool able to actuate the clamping means of the collar, such as a second pole, for example the second pole 500 of FIG. 5.

Figure 7:
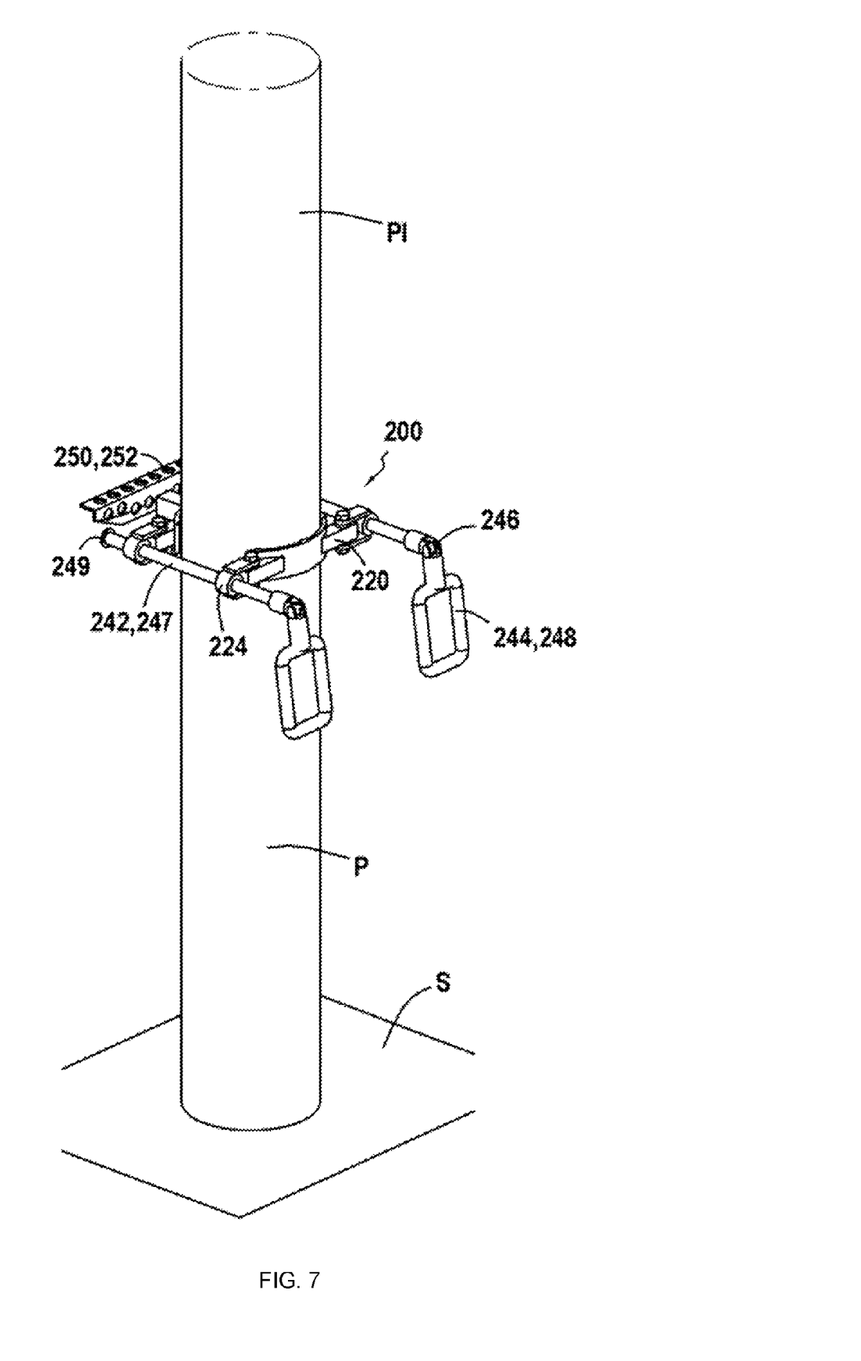
FIG. 7 schematically represents an exemplary embodiment of a positioning step of the method of FIG. 6.

In a positioning step E600, the collar 200 is positioned around the post P, more precisely on the lower part PI of the post, i.e. a part of the post P located at man height (see also FIG. 7).

For example, when the collar 200 comprises a first collar part 220 and a second collar part 230, the first collar part 220 and the second collar part 230 are positioned against the post P at the level of the lower part PI of the post P. More precisely, the semicircular part 228 of each part of the collar 220 and 230 can be positioned against the post P such that the post P is positioned inside these semicircular parts 228.

The clamping means 240 are also positioned such that the coupling means 242 of the two collar parts 220 and 230 link the first collar part 220 to the second collar part 230. Each threaded rod 247 of the coupling means 242 is thus typically screwed into a nut 224 of the first collar part 220 and a nut 224 of the second collar part 230, such that the first collar part 220, the second collar part 230 and the threaded rod or rods 247 surround the post P forming an enclosed structure, without tightening around the post P, in such a way as to be able to slide along the post P.

A removable stop 249 can then be attached, removably, to the second end of each threaded rod 247, such that the nut 224 of the first collar part 220 and the nut 224 of the second collar part 230 extending around this threaded rod 247 are retained on the threaded rod 247 between the cardan joint 246 and the removable stop 249. In a connecting step E610, the positioning means 210 of the collar 200 are connected to the first pole 400, such as to position the collar 200 at height around the post P (see also FIG. 8).

Figure 8:
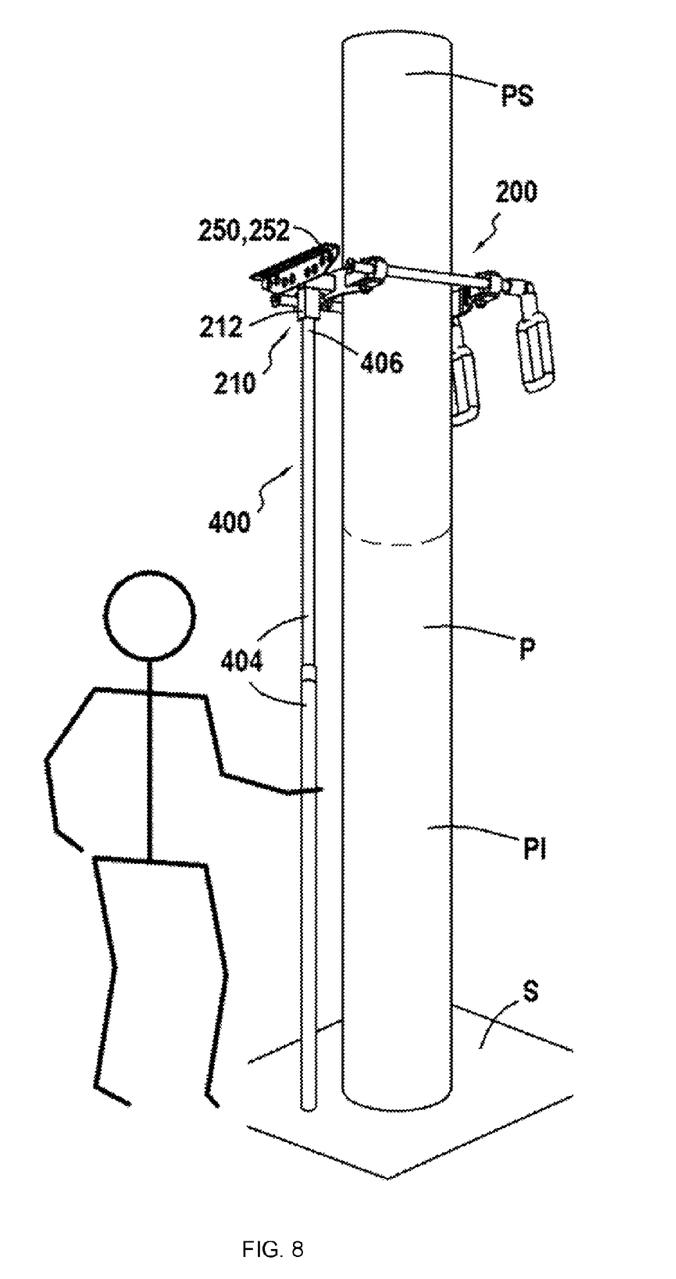
FIG. 8 schematically represents an exemplary embodiment of a connecting step of the method of FIG. 6.

The additional picking-up means of the first pole 400 are connected to the picking-up means 212 of the collar 200, the connection between the first pole 400 and the collar 200 allowing the first pole to raise the collar 200 up the post P until the collar 200 is positioned around the upper part PS of the post P, and further making it possible to retain the collar 200 at height around the post P.

Thus, when the picking-up means 212 of the collar 200 take the form of a cavity 212, the protrusion of the first pole 400 is typically inserted into the cavity of the picking-up means 212 of the collar 200, the outer edges of the protrusion of the first pole 400 being then able to bear on the bottom and/or the inner edge of the cavity of the picking-up means 212 of the collar 200, to allow the elevating of the collar 200 and/or its retaining at height around the post.

In a variant, when the picking-up means 212 of the collar 200 comprise a protrusion, the protrusion is inserted into the cavity of the first pole 400, the bottom and/or the inner edge of the cavity being then able to bear on the outer edges of the protrusion.

The collar 200 is typically raised by extending the sections 404 of the body of the first pole 400.

Figure 9:
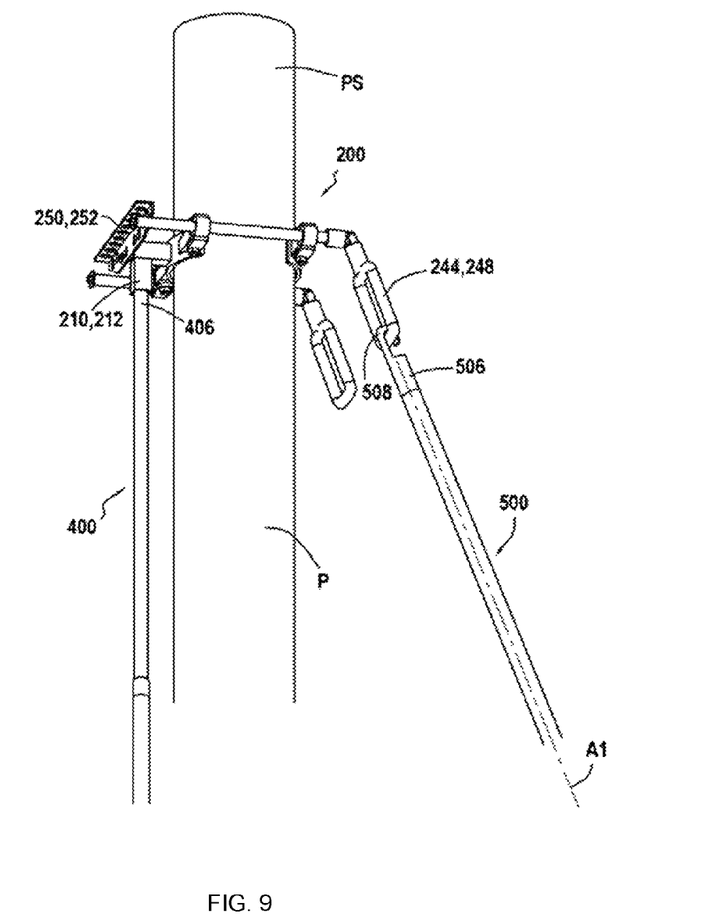
FIG. 9 schematically represents an exemplary embodiment of an actuating step of the method of FIG. 6.

In an actuating step E620, while retaining the position of the collar 200 at height around the post P by means of the first pole 400, the clamping means 240 of the collar 200 are actuated by means of the second pole 500, such as to fit around the collar 200 and thus attach the collar 200 to the post P (see also FIG. 9).

More precisely, when the clamping means 240 comprise coupling means 242, the gripping means 244 of the clamping means 240 are gripped by the gripping means 508 of the second pole 500. The gripping means of the second pole 500 then enter into rotation, this rotation being transmitted to the gripping means 244 of the clamping means 240 of the collar 200. The rotation of the gripping means 244 of the collar 200 is then transmitted to the coupling means 242 by the angular transmission means 246. The rotation of the coupling means 242 then brings the first collar part 220 and the second collar part 230 closer together.

For example, when the gripping means 244 comprise two ring-shaped handles, the hook 508 of the second pole 500 grips the ring of one of the handles 248, called the first handle 248.

The rotating means of the second pole 500 then allow the rotation of the hook 508 around the axis A1 defined by the body of the second pole 500.

The rotation of the hook 508 is transmitted to the first handle 248, the rotation of the first handle 248 being then transmitted to the threaded rod 247 associated with the first handle 248 by the cardan joint 246 linking the first handle 248 to the threaded rod 247. The rotation of the threaded rod 247 is made around the axis defined by the body of the threaded rod.

The rotation of the threaded rod 247 brings the nut 224 of the first collar part 220 and the nut 224 of the second collar part 230 closer together, which makes it is possible to clamp the collar 200 around the post. Specifically, the nut 224 of the first collar part 220 and the nut 224 of the second collar part 230 each being in a contrary direction of screw pitch, the rotation of the threaded rod allows the bringing of the two collar parts 220 and 230 closer together.

The hook 508 then hooks the ring of the other handle 248, called the second handle 248, the rotation of the hook 508 making it possible in the same way to bring the nut 224 closer to the first collar part 220 and the nut 224 of the second collar part 230 extending around the other threaded rod 247 closer together.

The rotation of the first handle 248 and/or the rotation of the second handle 248 can be repeated in order to further clamp the collar 200 around the post.

In a variant, when the clamping means 240 comprise a ratchet wheel, the rotation of the gripping means 244 of the collar 200 is transmitted to the toothed wheel by the angular transmission means 246, the rotation of the toothed wheel tightening the collar 200 by hooking at least one pawl.

Figure 10:
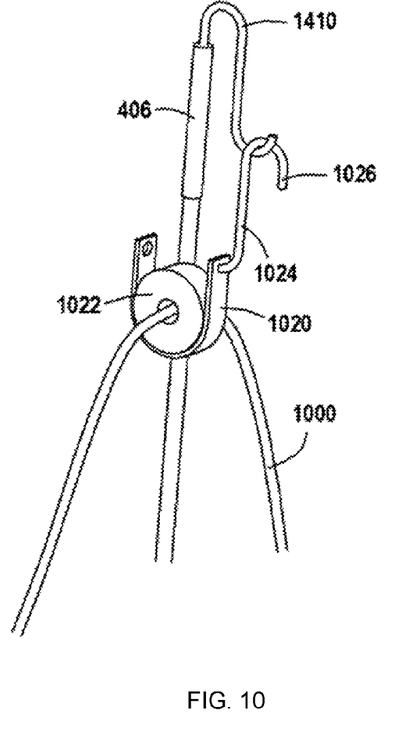
FIG. 10 schematically represents an exemplary embodiment of a hooking step of the method of FIG. 6.

In a hooking step E630, the network element or elements are hooked by means of the first pole 400 or the third pole (the hooking tool), to the retaining means 250 of the collar 200, in order to retain each network element on the post.

More precisely, when the retaining means 250 of the collar 200 comprise a crossbar 252, the network elements may comprise a cable 1000 and/or a cable support 1020 (see FIG. 10).

The support 1020 is typically attached to an S-shaped hook 1410 of the first pole 400 or of the third pole. The support 1020 can specifically comprise the retaining means 1022 for retaining the cable 1000 and means 1024 for retaining the support 1020 to the crossbar 252, the retaining means 1024 of the support 1020 typically taking the form of a rod curved at the at least one of its two ends 1026 and attached to the retaining means 1022 of the cable 1000.

Figure 11:
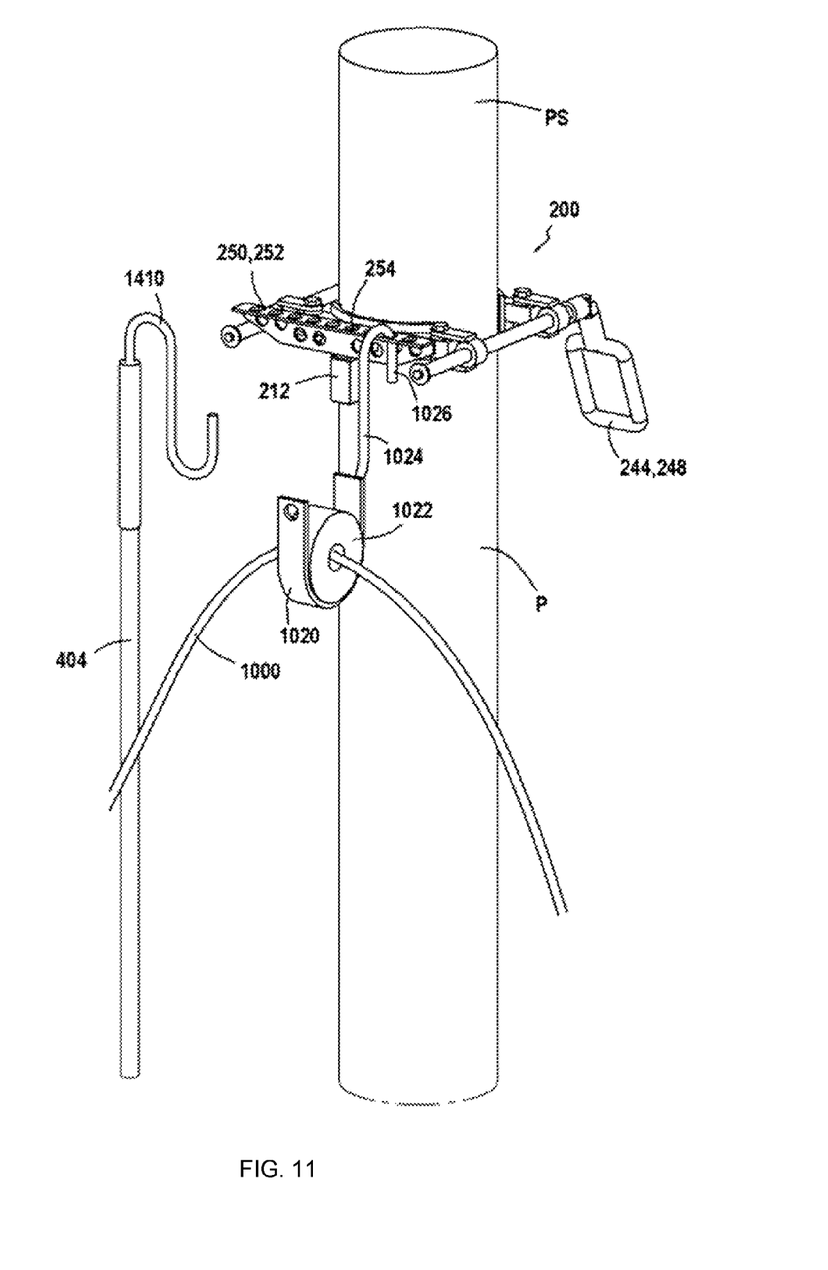
FIG. 11 schematically represents an example of a result of a hooking step of the method of FIG. 6.

The hook 1410 is then lifted, for example by extending the sections 404 of the first pole 400 or of the third pole at the level of the crossbar 252, then the retaining means 1024 of the support 1020 are hooked to the crossbar 252 (see FIG. 11). For example, at least one curved end 1026 of the retaining means 1024 of the support 1020 is inserted by means of the pole into an orifice 254 of the crossbar 252, such as to retain the cable 1000 and the support 1020 on the post P.

In a variant, when the retaining means 250 of the collar 200 comprise a ring 356, the network elements may comprise an anchoring clamp for the cable (not shown) and a cable, the anchoring clamp allowing the creation of a mechanical tension in the cable.

The embodiments have been described for a clamping collar comprising two collar parts. It will be understood that other embodiments may also be envisioned. For example, one end of the first collar part can be attached securely to an end of the second collar part (the two ends being for example able to come from material), the other end of the first collar part and the other end of the second collar part being able to be tightened, typically by way of the clamping means described previously, and thus bring the first collar part and the second collar part closer together. For other shapes of post, for example for tied posts, the clamping collar may comprise a number of parts greater than two.

The embodiments have been described with the positioning of the clamping collar on the lower part of the post then the elevating of the collar to the upper part of the post by means of the first pole. Other embodiments can be envisioned. This can for example involve raising the clamping collar off the post, then positioning it from the top on the upper end of the post, thus capping the post.

The invention claimed is:

1. A clamping collar for retaining at least one network element on a post, said collar adapted to fit around said post, said collar comprising:
   clamping means able to tighten the collar,
   means for retaining said at least one network element on the post, means for positioning the collar suitable for connecting the collar to a positioning tool, so as to be able to position the collar by means of the positioning tool,
   a first collar part; and
   a second collar part;
   wherein the clamping means are able to bring the first collar part and the second collar part closer together, and are configured to be actuated by means of a clamping tool, wherein said clamping means comprise:
      means for coupling the two collar parts,
      gripping means able to be gripped by means of the clamping tool, and
      angular transmission means forming a cardan joint between the gripping means and the coupling means, such that a rotation of the gripping means by means of the clamping tool allows a rotation of the coupling means, the rotation of the coupling means bringing the first collar part and the second collar part closer together.

2. The clamping collar of claim 1, wherein the positioning means comprise picking-up means able to be connected to additional picking-up means of the positioning tool positioned at one end of the positioning tool, to allow the elevating of the collar and/or the retaining of the collar at height by means of the positioning tool.

3. The clamping collar of claim 1, wherein an angle of the cardan joint between the gripping means and the coupling means is able to be adjusted by means of the clamping tool, such as to adapt the position of the gripping means to the position of the clamping tool.

4. The clamping collar of claim 1, wherein:
   the coupling means comprise at least one threaded rod,
   the gripping means comprise at least one ring-shaped handle, able to be gripped by a hook positioned at the end of the clamping tool.

5. The clamping collar of claim 4, wherein at least one collar part comprises a central section and at least one nut, said at least one nut extending around said at least one threaded rod, the central section being linked to said at least one nut by means of a pivot coupling, the pivot coupling allowing adjustment of said at least one collar part around the post.

6. The clamping collar of claim 5, wherein the central section comprises a semi-circular part comprising at least one retaining groove.

7. The clamping collar of claim 4, wherein:
   the cardan joint is positioned at a first end of said at least one threaded rod, and
   a removable stop is attached to a second end of said at least one threaded rod, such that the nut is retained on said at least one threaded rod, between the cardan joint and the removable stop.

8. The clamping collar of claim 1, wherein the retaining means comprises a crossbar, a hooking plate, and/or a ring.

9. A system for positioning at least one network element on a post, the positioning system comprising:
   the clamping collar of claim 1,
   the positioning tool able to position the collar, and the clamping tool able to actuate the clamping means of the collar.

10. A positioning system as claimed in claim 9, wherein the clamping tool comprises a second pole, a first end of the second pole comprising a hook and a second end of the second pole comprising a crank.

11. A method for positioning at least one network element on a post, the method implemented by means of the positioning system of claim 9, the method comprising:

connecting positioning means of the collar to the positioning tool, in order to position the collar, and while retaining the position of the collar by means of the positioning tool, actuating clamping means of the collar by means of the clamping tool, in order to tighten the collar and thereby attach the collar to the post.

12. The positioning method of claim 11, further comprising hooking, by means of the positioning tool or a hooking tool, said at least one network element to the retaining means of the collar, in order to retain said at least one network element on the post.

13. The clamping collar of claim 1, wherein the picking-up means of the positioning means comprises a cavity and wherein the additional picking-up means of the positioning tool comprises a protrusion configured to be inserted into the cavity of the picking-up means of the positioning means.

14. The clamping collar of claim 13, wherein the cavity and the protrusion each comprise a parallelepipedal shape.

15. The clamping collar of claim 1, wherein the picking-up means of the positioning means comprises a protrusion and wherein the additional picking-up means of the positioning tool comprises a cavity able to receive the protrusion of the picking-up means of the positioning means.

16. The clamping collar of claim 1, wherein the additional picking up means of the positioning tool comprises a removable endpiece.

* * * * *